March 4, 1947.      W. J. ARCHER      2,416,672
WIRE HOOD FORMING MACHINE
Filed May 15, 1945      12 Sheets-Sheet 3
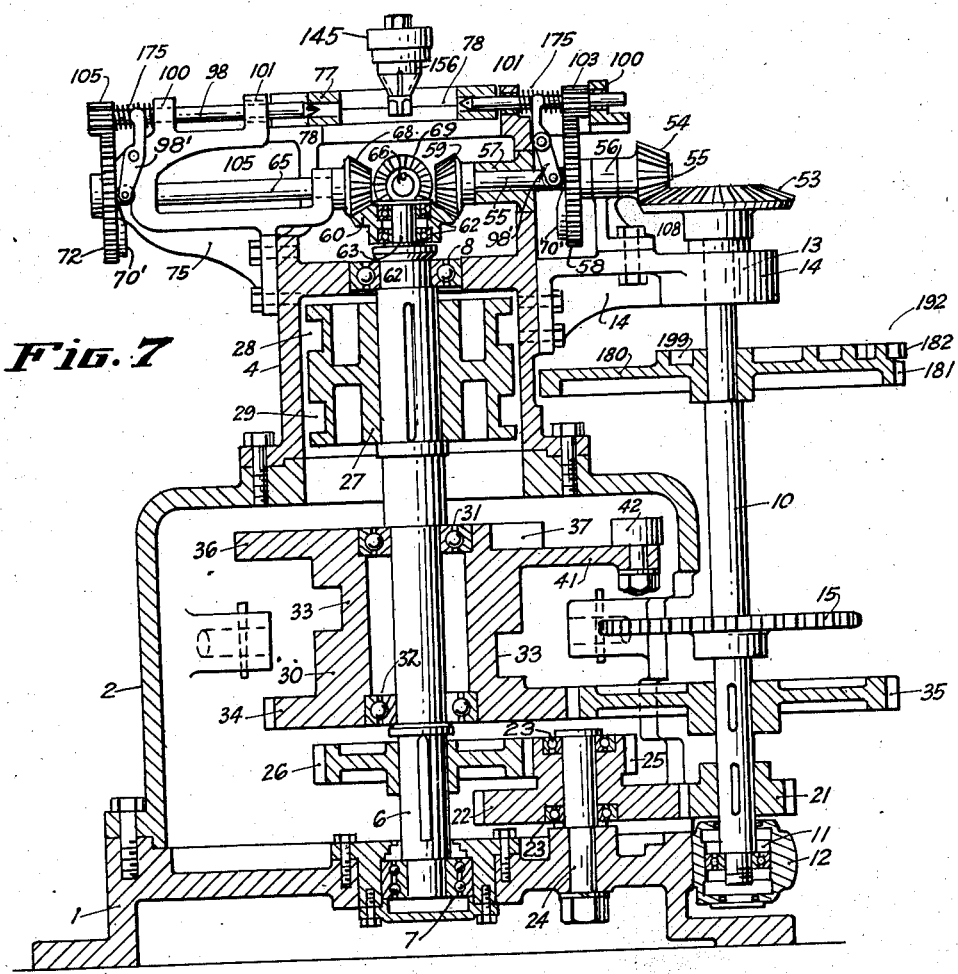
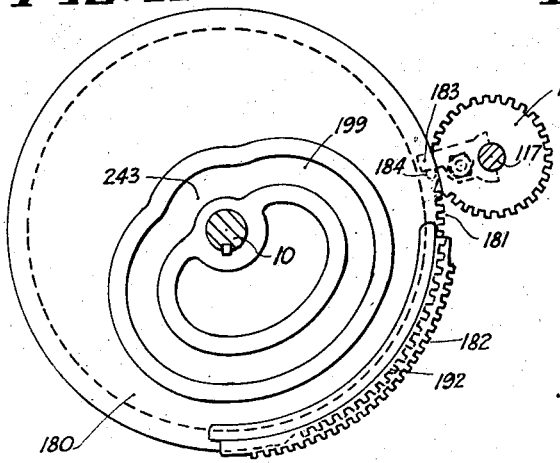
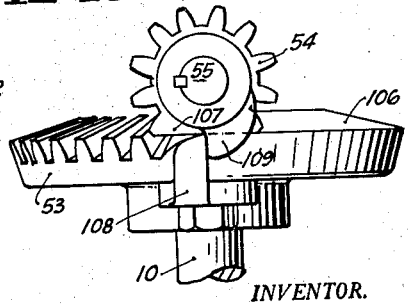
INVENTOR.
WILLIAM J. ARCHER
BY
ATTORNEY.

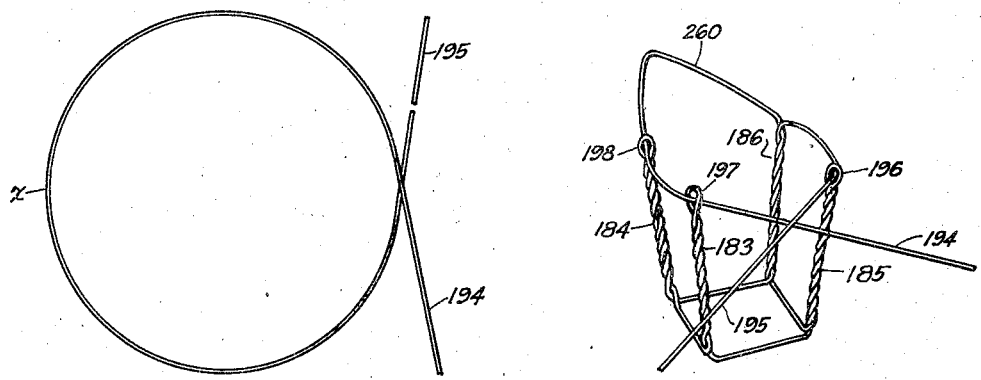

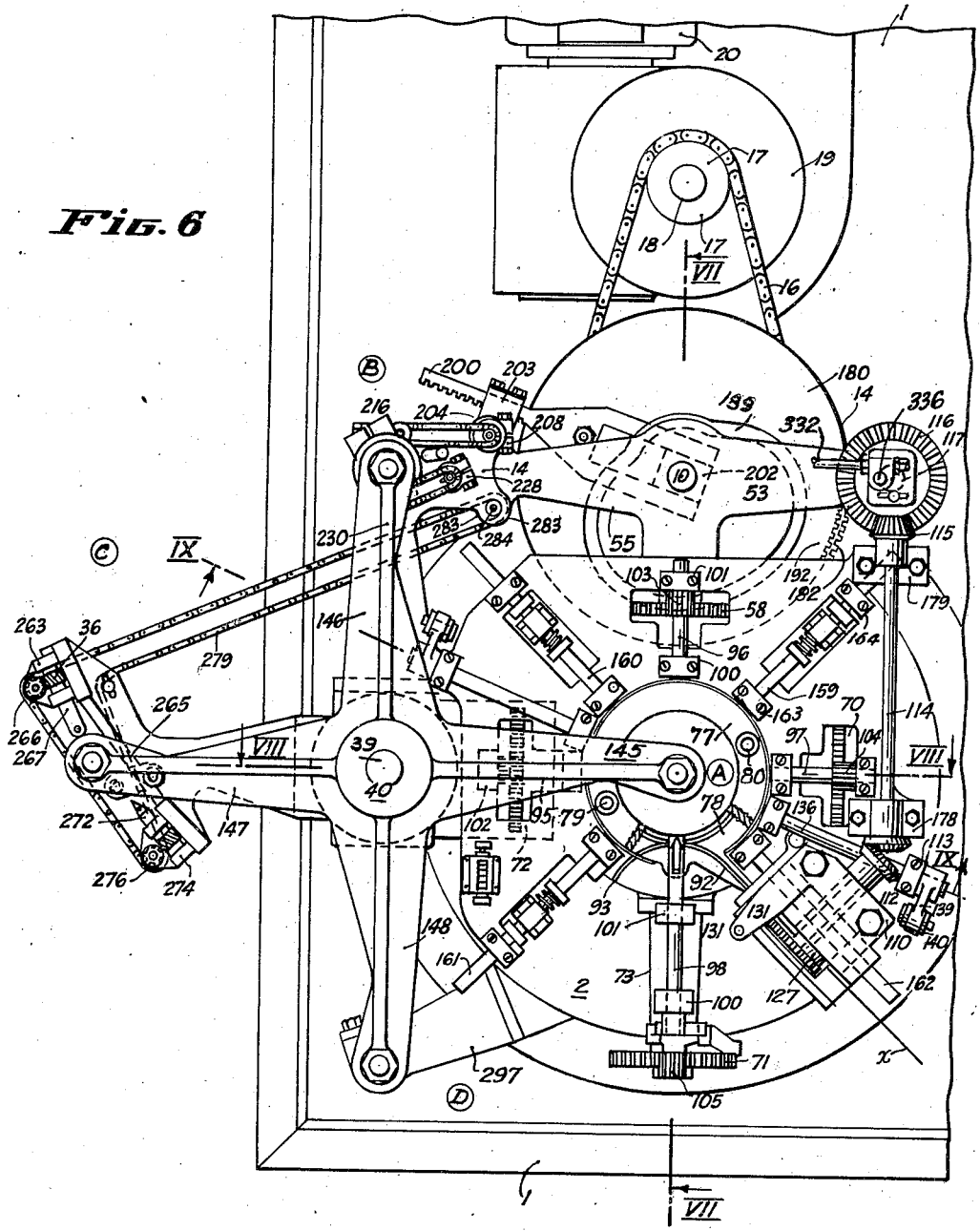

March 4, 1947.  W. J. ARCHER  2,416,672
WIRE HOOD FORMING MACHINE
Filed May 15, 1945  12 Sheets-Sheet 4
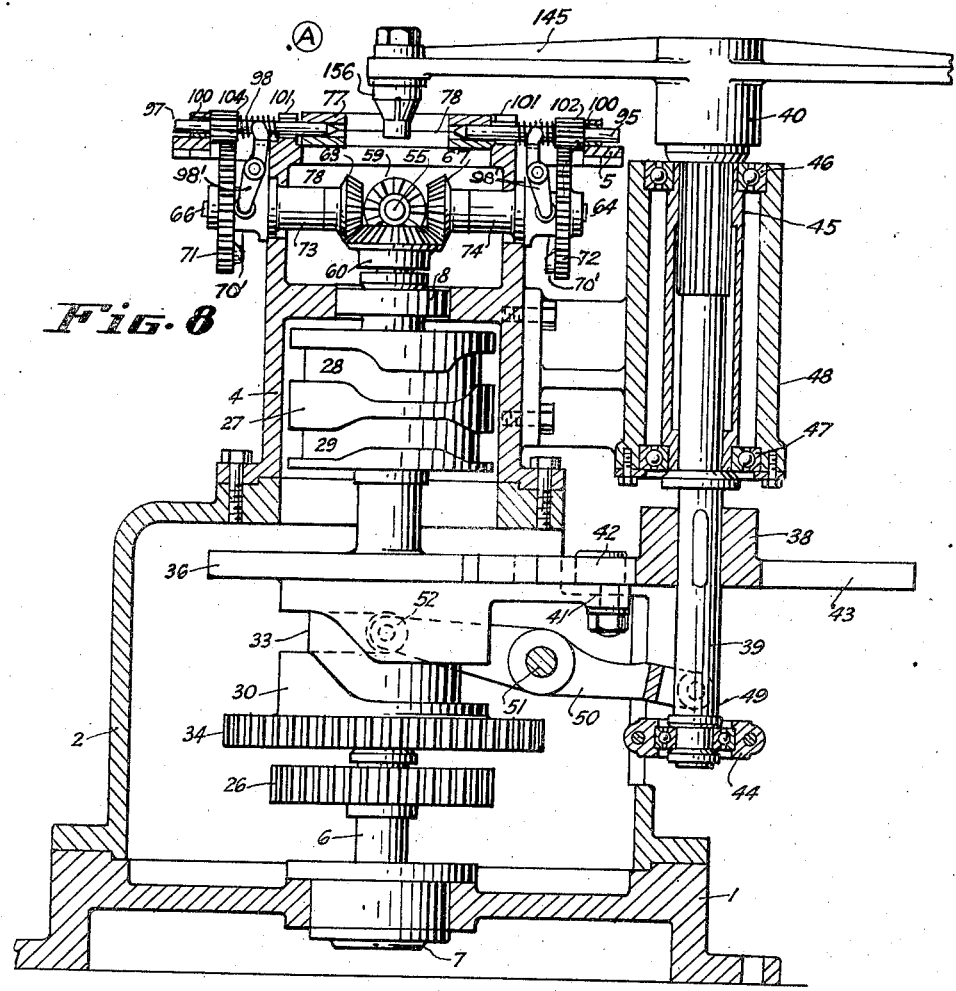
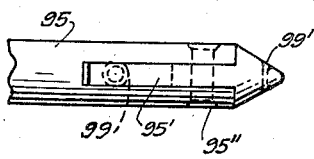
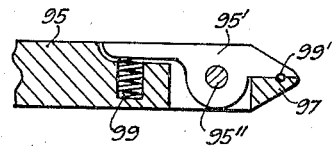
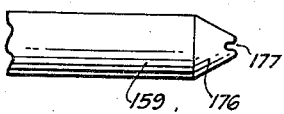
INVENTOR.
WILLIAM J. ARCHER
BY
ATTORNEY.

March 4, 1947.  W. J. ARCHER  2,416,672
WIRE HOOD FORMING MACHINE
Filed May 15, 1945  12 Sheets-Sheet 5
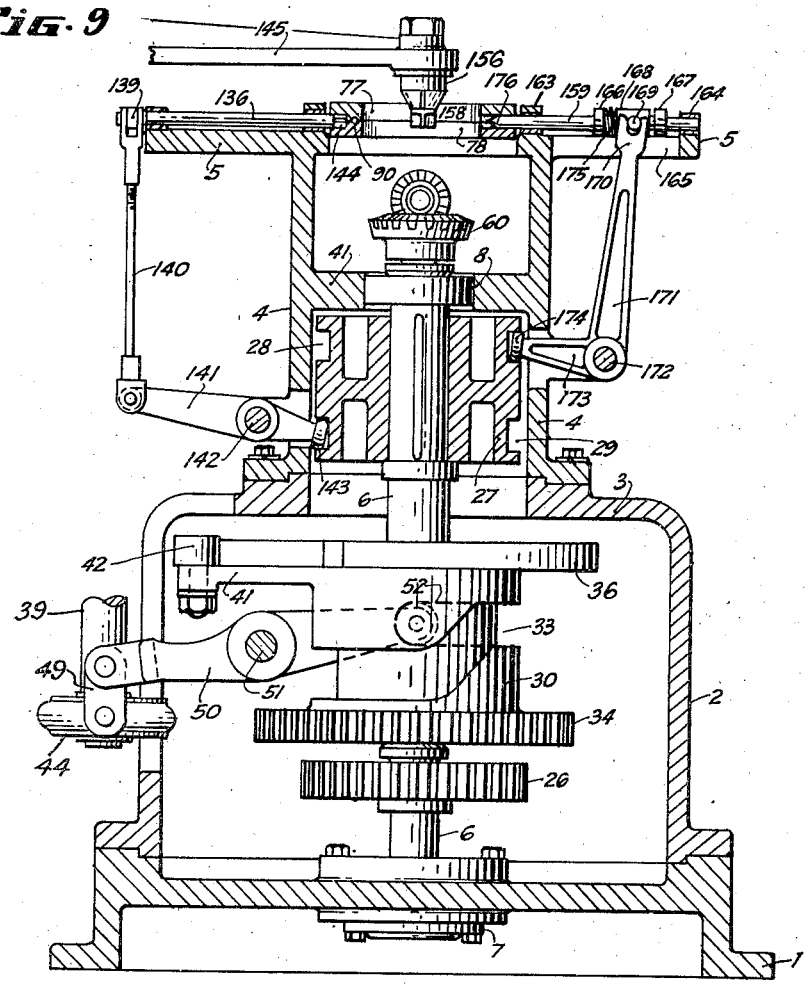
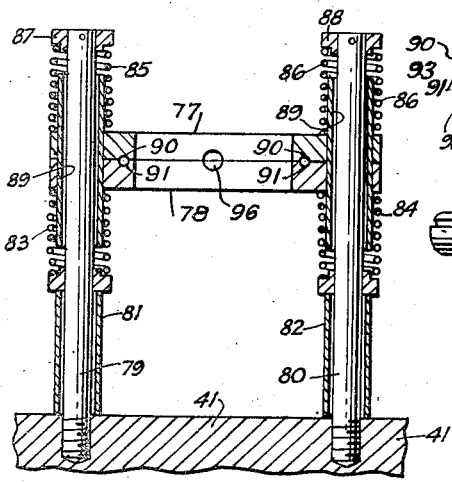
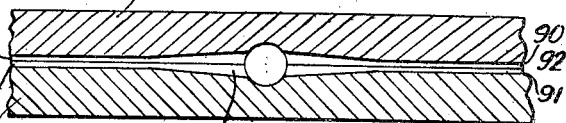
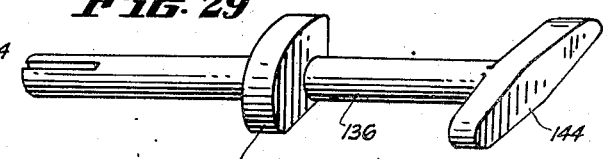
INVENTOR.
WILLIAM J. ARCHER
BY
Baldwin Vale
ATTORNEY.

March 4, 1947. W. J. ARCHER 2,416,672
WIRE HOOD FORMING MACHINE
Filed May 15, 1945 12 Sheets-Sheet 6
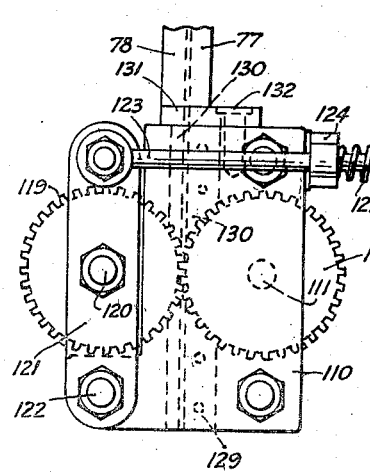
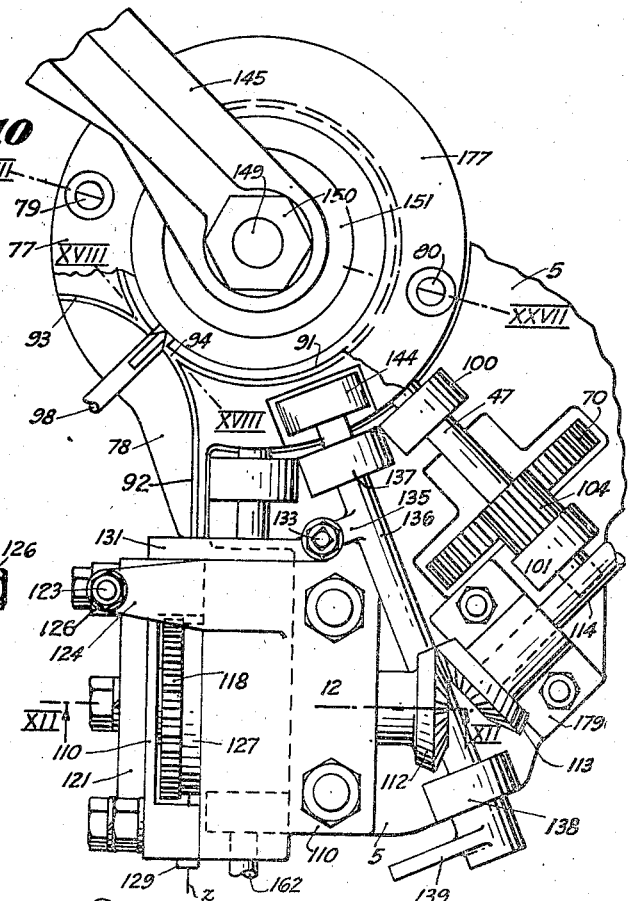
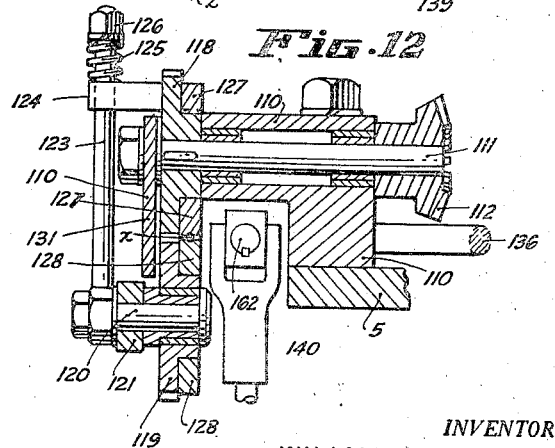
INVENTOR.
WILLIAM J. ARCHER
BY
ATTORNEY March 4, 1947. W. J. ARCHER 2,416,672
WIRE HOOD FORMING MACHINE
Filed May 15, 1945 12 Sheets-Sheet 7
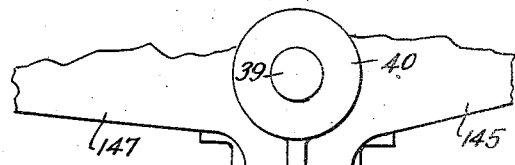
Fig. 13
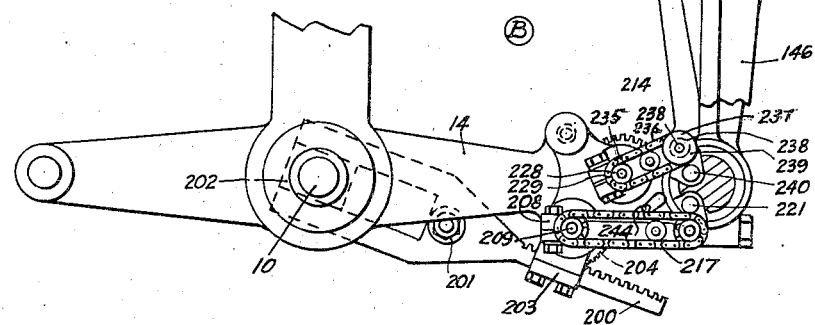
Fig. 14
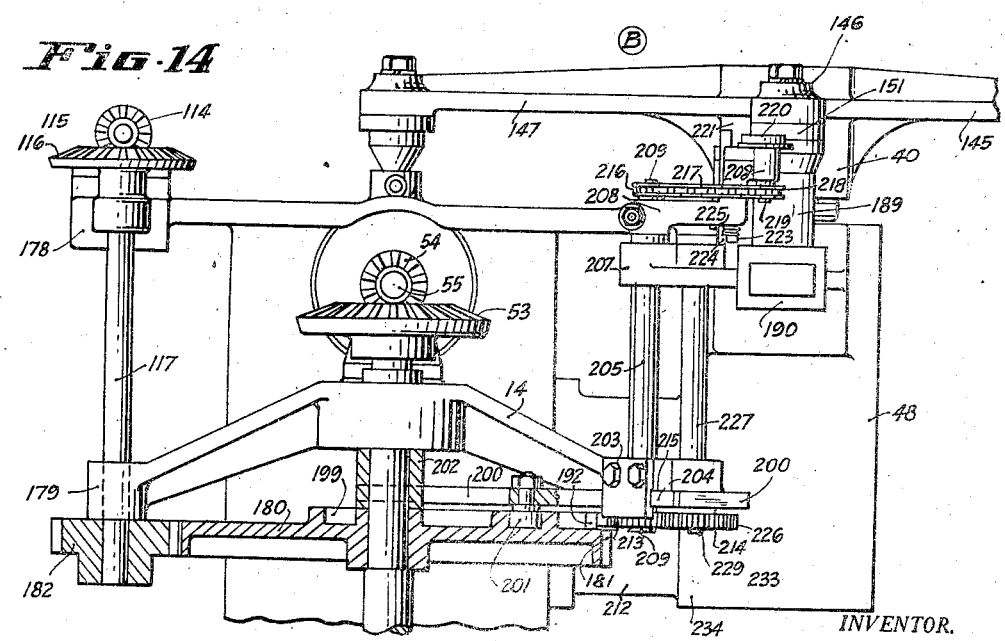
INVENTOR.
WILLIAM J. ARCHER
BY
ATTORNEY.

March 4, 1947.  W. J. ARCHER  2,416,672
WIRE HOOD FORMING MACHINE
Filed May 15, 1945  12 Sheets-Sheet 8

INVENTOR.
WILLIAM J. ARCHER
BY
ATTORNEY.

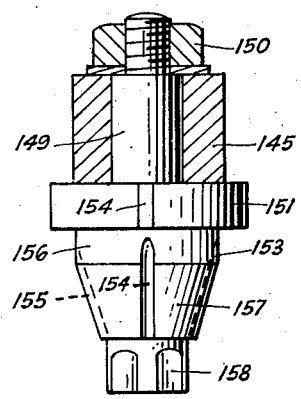
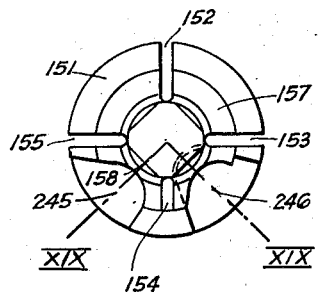
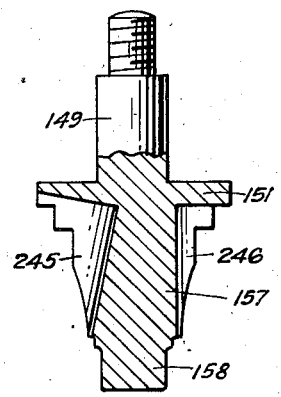
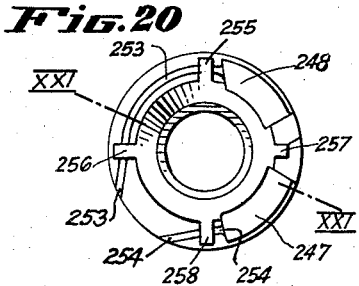
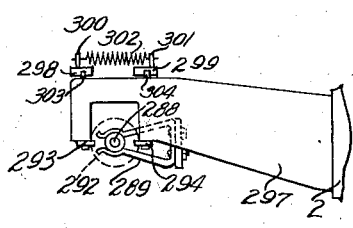
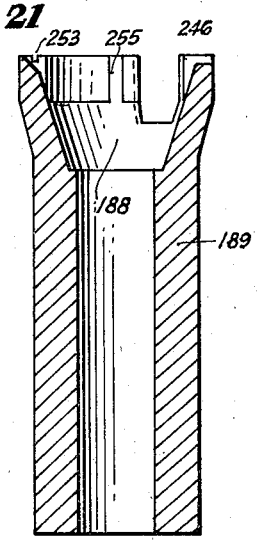
INVENTOR.
WILLIAM J. ARCHER

INVENTOR.
WILLIAM J. ARCHER

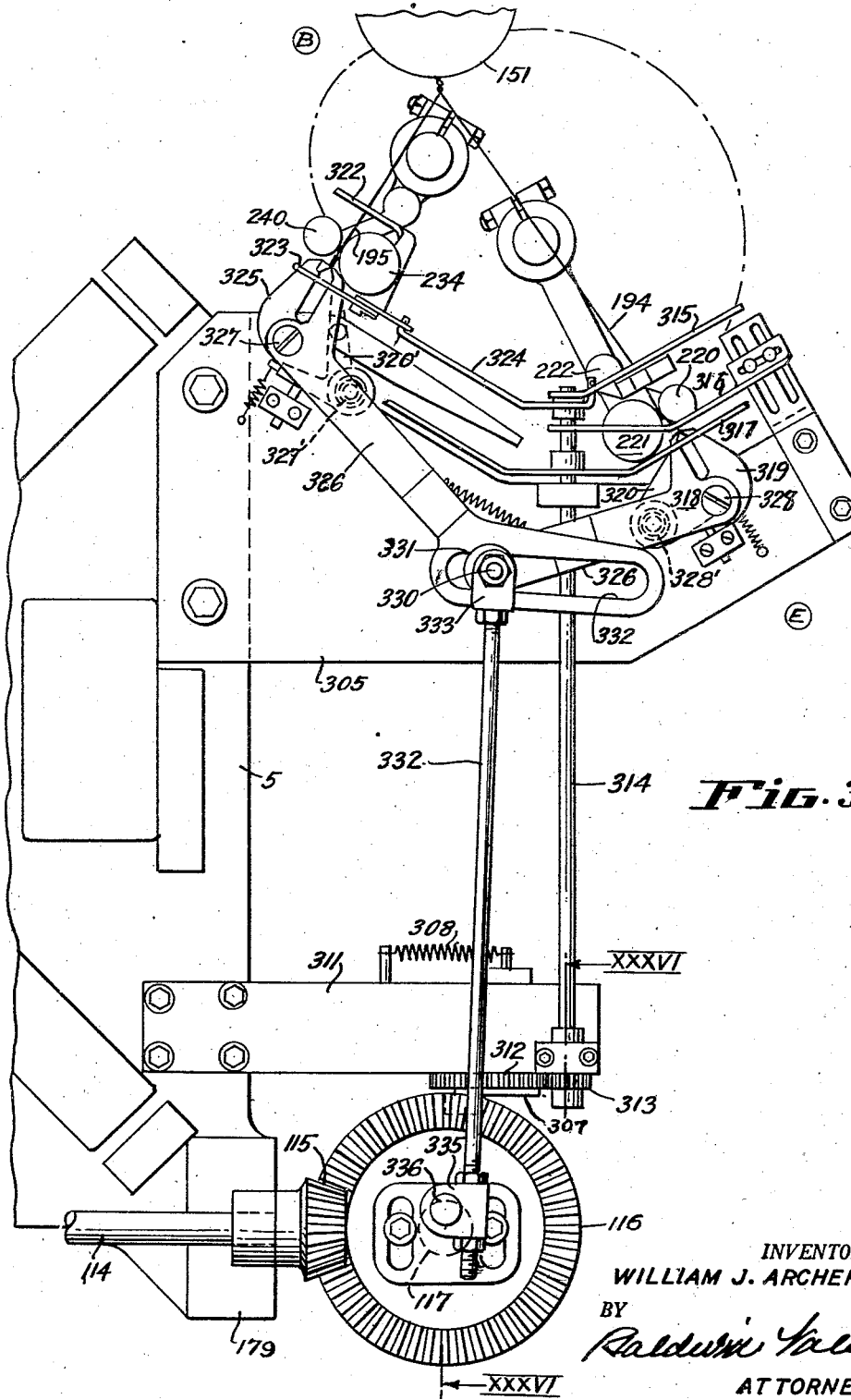

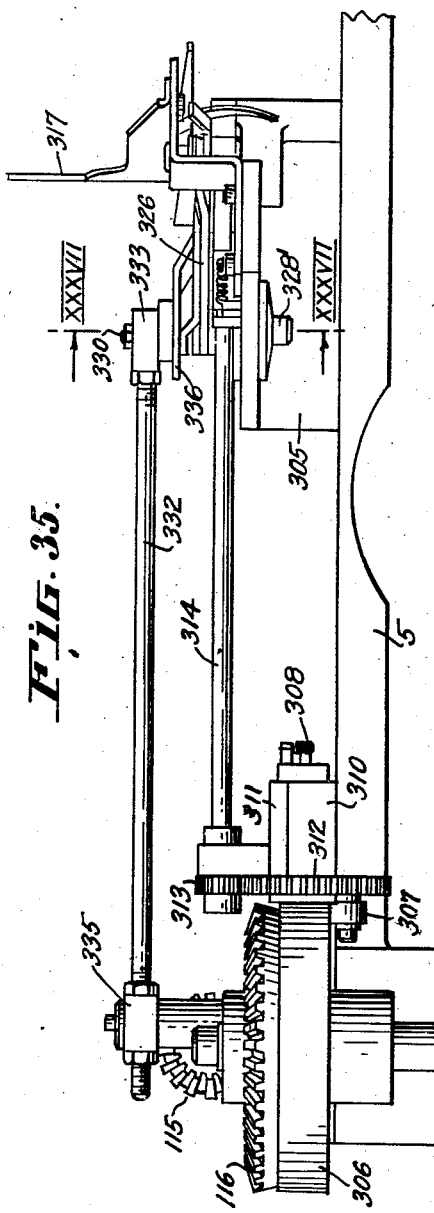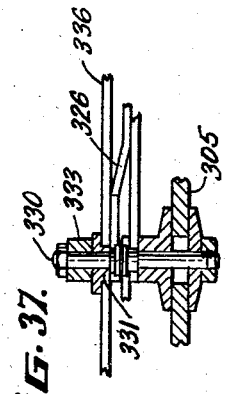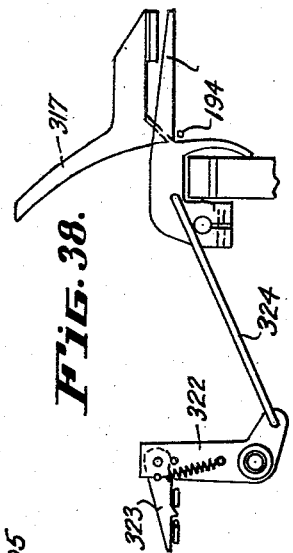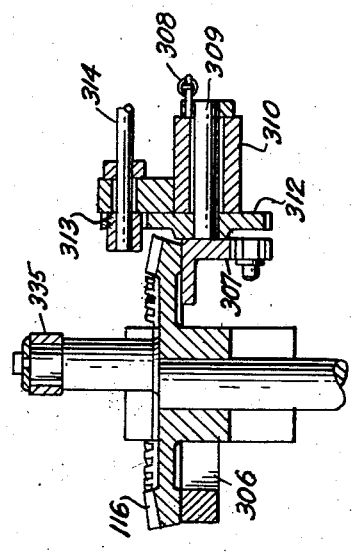

Patented Mar. 4, 1947

2,416,672

UNITED STATES PATENT OFFICE 2,416,672

WIRE HOOD FORMING MACHINE

William J. Archer, San Francisco, Calif., assignor, by mesne assignments, to Accessories, Inc., a corporation of California Application May 15, 1945, Serial No. 593,927

20 Claims. (Cl. 140—71)

This invention relates to wire hood forming machines and more particularly to fully automatic machines for forming wire hoods for bottles.

Among the objects of the invention is the provision of a machine in the class adapted to cut, form, twist, shape, reeve, discharge, bundle and count complete wire hoods for bottles, from an intermittently fed wire.

Another object is to simplify the construction by arranging the combinative elements around a common drive shaft to conserve space, assure accurate timing and attain the highest speed production consistent with the strength of the materials.

Other objects and advantages will appear as the description progresses.

In this specification and the accompanying drawings the invention will be disclosed in its preferred form. But it is to be understood that it is not limited to this form, because it may be embodied in modifications within the spirit of the invention as defined in the claims following the description.

The product of the present machine is illustrated in Figs. 1, 2, 3, 4, 5, and consists of a continuous piece of wire fed into the machine by traction rollers until it forms a circle with overlapping ends. This circular loop is then forced inwardly into the form of a cross, the opposed radial extensions of which are twisted upon themselves to form terminal loops to receive the wire ends that are automatically reeved and tucked therethrough to form a hood adapted to enclose the neck of a bottle to retain the stopper. These wire hoods are intended to prevent the stopper being blown out by the internal gases generated within the bottle, by wines such as champagne, or carbonated beverages. The bottles for this purpose have special necks to facilitate the attachment of the wire hoods.

In the twelve sheets of drawings:

Figs. 1, 2, 3, 4, 5 diagrammatically illustrate the progressive steps in the formation of the bottle cap, in accordance with this invention.

Fig. 6 is a plan view from above of a portion of the machine for receiving the wire and automatically forming the hood. The guiding and clipping assembly E being omitted.

Fig. 7 is a vertical section of the same on the line VII—VII, Fig. 6.

Fig. 8 is a similar view on the line VIII—VIII, Fig. 6, from the rear.

Fig. 9 is a similar view on the line IX—IX, Fig. 6.

Fig. 10 is an enlarged detail plan view from above of the wire feeding mechanism.

Fig. 11 is a front elevation detail of the same.

Fig. 12 is a vertical section of the same on the line XII—XII, Fig. 10.

Fig. 13 is an enlarged detail in plan view from above of the reeving mechanism, viewed from the rear of the machine.

Fig. 14 is a rear elevation of the same, partially in vertical section.

Fig. 17 is a front elevation detail of the forming mandrel.

Fig. 18 is a plan view from below of the same.

Fig. 19 is a vertical section of the same on the line XIX—XIX, in Fig. 18.

Fig. 20 is a top view of the forming die.

Fig. 21 is a vertical section of the same taken on the line XXI—XXI, Fig. 20.

Fig. 22 is a plan view from above of the actuating cam of the reeving mechanism.

Fig. 23 is a front elevation of the interrupted pinion and gear for driving the countershaft that synchronizes the functions of the machine.

Fig. 24 is an enlarged detail in plan view from above of the end clamp of one of the twister shafts.

Fig. 25 is a side elevation partially in vertical section of the same.

Fig. 26 is a fragmentary detail in side elevation of the notched inner end of one of the plunger shafts.

Fig. 27 is an enlarged detail view in vertical section of the resilient mounting for the pair of guide plates on the line XXVII—XXVII, Fig. 10.

Fig. 28 is a similar view of the guide plates, on the arcuate line from 92 to 93, Fig. 6.

Fig. 29 is a detail in perspective of the plate spreading cam shaft mechanism, see Fig. 9.

Fig. 32 is a detail plan view from above of the bundling mechanism at D, the mandrel being indicated by dot dash line.

Fig. 33 is a side elevation of the same.

Fig. 34 is an enlarged plan view detail of the guiding and clipping assembly at E.

Fig. 35 is a side elevation of the same, viewed from the rear of the machine.

Fig. 36 is an enlarged fragmentary detail in vertical section of the intermittent drive of the same.

Fig. 37 is a fragmentary vertical section of the clipping jaw actuating mechanism.

Fig. 38 is a fragmentary detail in front elevation of the guiding mechanism, viewed along the line of the driven shaft thereof.

Figure 15:
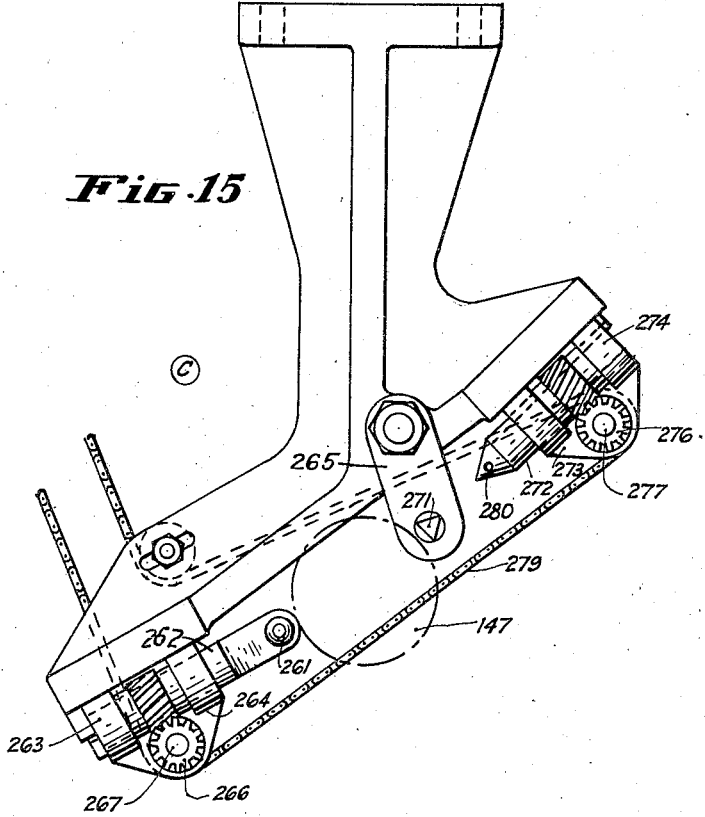
Fig. 15 is an enlarged detail in plan view from above of the finishing mechanism.

In detail the construction illustrated in the drawings, referring first to Fig. 9, comprises the base 1, adapted to be bolted to the floor. The cylindrical gear case 2 is bolted to the base and has the flanged top 3. The cylindrical cam case 4 is bolted to the top 3 of the gear case and has the horizontal table 5 integral therewith; all combined to form a main frame.

The vertical main shaft 6 has its lower end stepped in the antifriction bearing 7, and its upper end journaled in the antifriction bearing 8 in the upper portion of the cam case 4.

Figure 30:
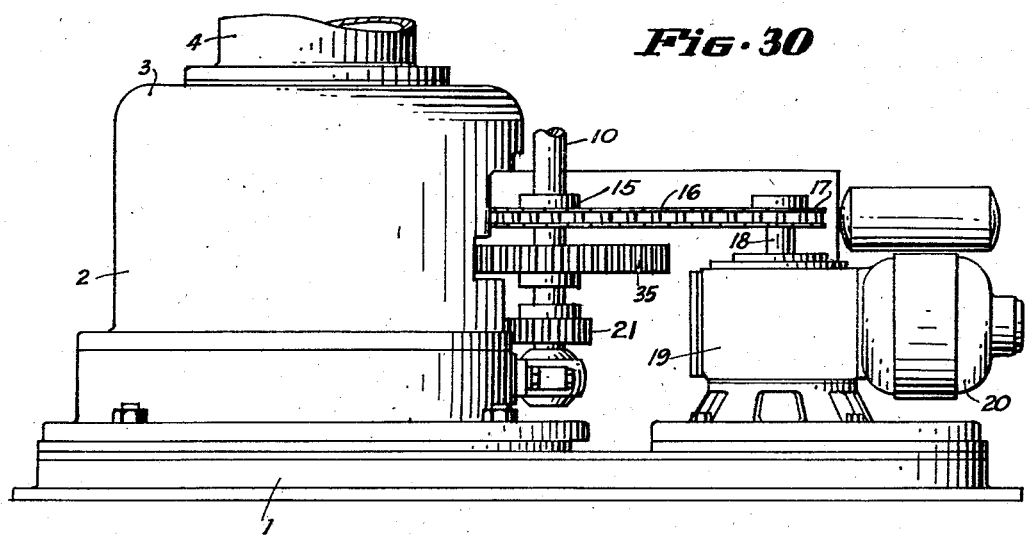
Fig. 30 is a side elevation of the motor driven reduction gear assembly connected with the main frame assembly on the base of the machine.

The vertical countershaft 10, Fig. 7, has its lower end stepped in the ball bearing 11 mounted in the pillow block 12 bolted to the base 1. Its upper end is housed in an antifriction bearing 13 in the bracket 14 bolted to the side of the cam case 4. The sprocket 15 is fixed to the countershaft 10 and driven by the sprocket chain 16, Fig. 30, encircling the drive sprocket 17 on the vertical driven shaft 18 of the gear reduction unit 19 mounted on the base 1. This unit is directly connected with the motor 20 supported thereby.

The pinion 21 is fixed on the countershaft 10, Fig. 7, and meshes with the spur gear 22, having the antifriction bearing 23, mounted on the stud 24 fixed in the base 1. The gear 22 has the integral reducing pinion 25 meshed with the spur gear 26 fixed on the main shaft 6, whereby the main shaft 6 is driven by the motor 20 through the intermediate gearing 17—26, in the clockwise direction. The cam block 27 is keyed to the main shaft 6 and has the peripheral cam slots 28, 29 therein.

The hub of the free cam 30 has the antifriction bearings 31, 32, mounted on the drive shaft 6, upon which the cam hub revolves freely. This hub has the contour slot 33 cut in its periphery and is driven by the integral spur gear 34 meshed with the driving gear 35 keyed on the countershaft 10, by which it is driven contra-clockwise. The concentric head 36 integral with the hub 30, has the arcuate gap 37 to clear the overlapping Geneva wheel 38, Fig. 8, splined on the shaft 39 of the transfer head 40 that is fixed on the upper end of the shaft 39. The head 36, Fig. 7, has the extension lug 41 with the cam follower roller 42 thereon and adapted to engage the slots 43 of the Geneva wheel 38, Fig. 8, the functions of which will be hereinafter more fully described.

The lower end of the shaft 39 is stepped in the bearing housing 44. The upper portion of the shaft 39 is splined into the sleeve 45 which revolves in the antifriction bearings 46, 47 mounted in the bracket 48, bolted to the cam housing 4. The shaft 39 slides freely in the sleeve 45 that is splined to the Geneva cam 38, by which it is rotated.

The floating bearing 44 is pivotally supported by side links at 49 depending from the rocker arm 50, that it pivoted on the shaft 51 extending across the wall of the gear case 2, Figs. 8, 9. The inner end of the rocker arm has the roller 52 following the contour 33 of the cam 30 for raising and lowering the shaft 39 in synchronism with the wire forming and twisting mechanism, at A.

The wire twisting mechanism is driven by the interrupted bevel gear 53, Fig. 7, keyed on the upper end of the countershaft 10 and meshed with the bevel pinion 54 fixed on the end of the short shaft 55. This shaft is journaled in the bearing 56 on the main bracket 14, and in the bearing 57 on the cam case 4. The spur gear 58 is fixed on this shaft 55 having the bevel pinion 59 fixed on its inner end. This pinion 59 meshes with and drives the intermediate bevel gear 60, having the antifriction bearings at 62 engaging the stud 63 formed on the end of the main shaft 6, so that the gear 60 rotates independently of the main shaft. The shafts 64, 65, 66, similar to 55, have their respective bevel pinions 67, 68, 69, meshed with and driven by the intermediate bevel gear 60, Figs. 7, 8. These several shafts are set at 90 degrees to each other on opposite sides of the main shaft 6, and have the spur gears, 70, 71, 72, similar to 58 fixed thereon respectively. These shafts 64—66 are journaled in their respective brackets 73, 74, 75, similar to 57, fixed to the sides of the main frame beneath the table 5.

A pair of annular wire guide plates 77, 78, see Fig. 27, are mounted slightly above the plane of the table 5 concentric with the axis of the main shaft 6. These horizontal plates are supported on the stud bolts 79, 80 threaded into the internal flange 41 within the cam case 4 holding the bearing 8. The sleeves 81, 82, encircle the lower portions of these bolts to provide bases for the springs 83, 84 supporting the weight of the pair of plates 77, 78. The top springs 85, 86, encircle the bolts between the top plate and the heads 87, 88 on the bolts respectively. To assure free up and down movement of the pair of plates on the guiding stud bolts, it is advisable to interpose sleeves, such as 89, between the guide holes in the plates 77, 78 and the bolts 79, 80. The plates are held in forced contact by the expansion of the springs 83—86.

The inner faces of the plates are provided with annular wire guiding means consisting of registering grooves semicircular in cross section, 90, 91, adjacent the center opening in the annular plates, see Fig. 27. These grooves have the tangential inlet 92, Fig. 10, and outlet 93, intersecting the concentric grooves 90, 91 in the plates. The inlet 92 leads inward from the wire feeding and cutting mechanism and the outlet 93 carries the end of the wire beyond the periphery of the pair of plates. At the point of intersection of the guide grooves 90, 91 and 92, 93 they are made deeper, as at 94, permitting the incoming and outgoing terminals of the wire to overlap. The inlet and outlet are preferably arcuate to change the direction of the wire, without giving it a permanent set, see Fig. 28 also.

At intervals of 90 degrees the pair of plates are drilled to receive the tapered ends of the twister shafts 95, 96, 97, 98, see Figs. 6, 7, 8. These drilled holes form radial sockets which extend inwardly beyond the concentric wire guide grooves 90, 91. These twister shafts are all alike and have a pivoted clamp jaw 95′, Figs. 24, 25, tapered to conform to the tapered end of the shaft, and forming the two jaws of a spring clamp adapted to fit snugly within the said socket in the plates. The clamp jaws are held normally closed by the tension of the interposed spring 99. The tapered jaws of this clamp are grooved to form the transverse hole 99′, registering with the annular wire guide hole formed by the grooves 90, 91, in the plates 77, 78.

These twister shafts 95—98 are journaled in bearings such as 100, 101 on the table 5, Figs. 7, 8, and have the pinions such as 102, 103, 104, 105, meshed with their respective driving gears 70, 71, 58, 72, and are intermittently driven thereby through the interrupted gear and pinion 53, 54, Figs. 7, 23. The gear 53 is driven continuously by the countershaft 10, but it has the blank pitch area 106, over which the blank area 107 on the pinion 54 slides without rotating the shaft 55, causing a dwell interval in the operation of the twister mechanism while a new length of wire is being fed in between the closed plates 77, 78. To assure positively timed engagement of the teeth of the gear and pinion 53, 54, the gear is provided with a trip lug 108, to engage the lug 109 on the pinion.

The wire feed, Figs. 6, 10, 11, 12, comprises the bracket 110, overhanging and bolted to the table 5. The shaft 111 is journaled in bearings in this bracket, and is driven by the bevel gear 112 fixed thereon and meshed with the similar gear 113, on the shaft 114, Fig. 10. This shaft is driven through the similar gears 115, 116, Fig. 6, the latter being keyed to the vertical shaft 117 that is synchronized with the forming operation, as hereinafter more fully described.

The gear 118, Fig. 12, is fixed upon the outer end of the shaft 111 and meshes with the similar gear 119 free on the stud 120. This stud is fixed in the end of the swing arm 121 pivoted on the stud 122 fixed in the bracket 110, Fig. 11. The free end of the arm 121 is operated by the tension rod 123 extending upwardly through the lug 124 on the bracket 110. The spring 125 expands between the lug 124 and the tension adjusting nut 126 threaded on the end of the rod 123. Each of the gears 118, 119 is provided with traction rolls 127, 128 respectively, and feed the wire X therebetween without injury to its tinned surface. The necessary tractive tension is applied to the wire by the spring 125 and adjusting nut 126.

The wire guiding dies 129, 130 are fixed to the bracket 110 and have holes therethrough in line with the meeting peripheries of the traction rolls 127, 128. The wire X is fed from a feed reel, not shown, and maintained under the tension necessary to prevent kinking. The wire cutter consists of the blade 131 pivoted on the stud pin 132, Fig. 11, fixed in the end of the bracket 110. It has a hole therethrough in line with the hole through the adjacent die 130 in cooperation with which it acts to shear off the wire. The inner end of this blade has the vertical adjustment pin 133, Fig. 10, threaded therein and locked by a lock nut. The protruding lower end of this pin rests upon the cam lug 135 on the shaft 136 in the bearings 137, 138 on the table 5, see also Fig. 29.

The shaft 136 is oscillated by the arm 139, connected by the link 140, Fig. 6, with the rocker arm 141, Fig. 9, pivoted at 142 on the cam case 4. The inner end of this arm has the antifriction roller 143 engaging in the contour cam slot 29, to cut the wire synchronously with the forming and twisting cycle A. The shaft 136 extends into a socket between the plates 77, 78, and has a transverse cam head 144, thereon, Fig. 29, which cooperates with the upper and lower portions of the socket to pry these plates apart in synchronism with the forming cycle A.

The transfer head 40 on the shaft 39, Fig. 6, has four radial arms 145, 146, 147, 148 each timed to progressively receive a formed and twisted wire hood at A, transfer it to the reeving assembly at B; and to the terminal finishing assembly at C; thence to the stacking and counting machine at D. Each of these arms, such as 145 is provided with a receiving mandrel, see Figs. 17–19. These mandrels being the same in each instance, detailed description of one is deemed to be sufficient. The mandrel has the stud 149 passing upward through the arm, such as 145, to which it is fixed by the nut 150. The annular head 151 has the longitudinal slots 152, 153, 154, 155, Fig. 18, terminating at the diameter of the body portion 156 which tapers downward at 157 to the square end 158. The axis of the mandrel is vertically alined with the vertical axis of the plates 77, 78, Fig. 7.

The four flat sides of the square end 158 are horizontally alined with the four plunger shafts 159, 160, 161, 162, slidably guided in their respective guides on the table 5, Fig. 9. Since all these plungers are alike in construction and operation, it is deemed sufficient to describe only one in detail. The plunger 159 is slidable in the guides 163, 164 on the table 5 above the slot 165 therethrough. The plunger has the integral annular flange 166 and the adjustable collar 167 thereon, with the trunnion sleeve 168 slidable therebetween, and having the trunnions such as 169 projecting laterally therefrom. The yoke head 170 on the bell crank 171 engages these trunnions. The bell crank is pivoted at 172 on the side of the cam case 4 and has the extension 173 projecting thereinto and provided with the antifriction roller 174 engaging the cam slot 28, in the cam 27, whereby all the plunger shafts 159—162 are reciprocated in sequence by the contour of the rotating cam slot. The cushion spring 175 is interposed between the flange 166 and the trunnion sleeve 168. The inner ends 176, see Fig. 26, of all the plungers 159—162 enter lateral sockets between the plates 77, 78 and have transverse notches 177 therein alined with the wire guide grooves 90, 91 in the plates.

The wire feed shaft 114, Figs. 6, 10, is journaled in the bracket 178, bolted to the edge of the table 5, above the plane of the bevel gear 116, and in the bracket bearing 179 forming part of the bracket 14, Fig. 7, above the cam plate 180 on the countershaft 10. The gear segment 181, Fig. 14, is cut in the periphery of the cam plate 180 and intermittently engages the spur gear 182, Fig. 22, on the lower end of the shaft 117. To insure the proper meshing of the teeth of the gear and the segment, the gear is provided with the trip 183, extending into the path of the pin 184. This segment and gear engagement intermittently drives the wire feed rolls 127, 128 to advance the wire X into the twisting mechanism at A, see Figs. 6, 10. The forward end of the wire at the cutoff blade 131 moves into the inlet 92, thence into the annular guide formed by the registering grooves 90, 91 in the plates 77, 78 forced together by the springs 83—86, Fig. 27.

The end of the wire advances clockwise through the openings 99' in the clamps forming the noses of the several twister shafts 95—98, Fig. 25; also past the notches 177, Fig. 26, in the ends of the intermediate plungers 159—162, and emerges through the outlet 93 of the plate grooves 90, 91. The length of wire fed between the plates being measured to complete one twisted wire hood, see Fig. 5.

At this moment the segmental drive 180, 181, disengages and the cam 135, Figs. 10, 22, rises to cause the blade 131 to cut the wire; simultaneously the cam head 144, Figs. 9, 29, oscillates and pries the plates 77, 78 apart. The separated plates permit the plungers 159—162 to advance seriatim until their ends push the wire against the flat sides of the square end 158 of the mandrel. The expansion of the springs 175, Fig. 6, insures sufficient and constant pressure at these respective points as the several rollers, such as 174, Fig. 9, follow the contour of the cam slot 28.

As the plungers advance they pull in the slack of the wire running through the notches 177 until all four plungers have advanced against the square end 158. The forward movement of these several plungers 159—162 takes up the slack wire between the twister shafts and holds it against the mandrel until the twister shafts perform their function. The resulting tension of the twisted portions 183—186, Fig. 2, causes the wire to grip the end 158 of the mandrel and travel with it until stripped off by the bundling assembly at D. Synchronously with the full stroke of all the plungers 159—162, the interrupted gearing at 53, 54, Fig. 7, has engaged to revolve all the twister shafts 95—98, still holding the looped wire in their respective clamp ends as at 99′, until the wire surrounding the square end 158 is twisted tight enough to insure its frictional adherence thereto when released by the plungers and twister shafts, by the separation of the plates 77, 78 and the rise of the mandrel.

At this moment the roller 52 in the cam slot 33, Fig. 9, causes the arm 50 to lift the shaft 39, Fig. 8, elevating the head 40 and transfer arm 145, and the mandrel end 158 above the plane of the separated plates 77, 78. This pulls the twisted end loops 183, 184, 185 and the twisted ends 186 of the wire hood out of their respective twister clamp jaws 95′ against the yielding tension of the springs such as 99, Fig. 25, and the pull of the cam levers such as 98′, actuated by the cams such as 70′ on the several spur gears 70—73.

Synchronously with the rise of the transfer head 40, the roller 42, Fig. 8, working in the slot 43 of the Geneva gearing 36—38, swings the transfer head one-quarter of a revolution contra clockwise so that the arm 145 assumes the position of the arm 146 at B, see Fig. 6. In the meantime the cam slot 33, Fig. 9, has lowered the rocker arm 50, lowering the transfer shaft 39, and restoring the transfer head 40 synchronously with the resetting of the various wire feeding, twisting, forming, reeving and stacking mechanism at A, B, C, D, for a repeat cycle of operation.

The product of the twisting operation at A, rises from the center opening of the plates 77, 78 in substantially flat form, Fig. 2, attached to the mandrel portion 158. With the next cycle of operation the arm 145 assumes the position of the arm 146, Fig. 6, above the shaping, reeving and tucking mechanism at B, which gives it a substantially conical shape, Fig. 3. When the arm 146 descends it forces the mandrel down into the shaping die 188 in the upper end of the tube 189, Fig. 21, which drives the twisted ends 183—186 into the grooves 152—155 of the mandrel and gives the hood a conical shape and concentrically alines all the eyes of the twisted extensions of the hood. The head 151 bends the wire ends 194, 195 horizontally over the edge of the die 189.

The tube 189 is mounted in the bracket 190, bolted to bracket 48 extending outward from the main frame and is the foundation for the forming and reeving operation at B, Fig. 14. After the hood is formed into the cone shape with the twisted extensions 183—186 lying within the mandrel grooves 152—155, the free ends 194, 195 of the wire are curled backward and reeved through their respective eyes 196, 197, 198, Fig. 4, to be twisted together, as in Fig. 5.

This reeving operation is controlled by the cam slot 199 in the face of the cam plate 180, that is fixed on the shaft 10, Fig. 22. This cam plate is synchronized by the intermittent engagement of the segmental gear 192, bolted to the cam plate 180, Figs. 6, 14, as previously described. The reciprocating rack 200, Fig. 13, has the antifriction roller 201 thereon and running in the cam slot 199. The bifurcated end of the rack straddles the guide block 202 on the shaft 10, Fig. 13. The rack 200 is slidable in the guide 203 on the bracket 14. The rack meshes with a gear 204, Figs. 13, 14, on the vertical tube 205. This tube oscillates in the upper and lower bearings in the guide 203, and in the upper bearing 207 respectively, mounted on the bracket 190. The swing arm 208 is adjustably fixed on the upper end of the tube 205 and is swung one half revolution and back by the reciprocations of the rack, see Figs. 6, 14, 31.

The shaft 209 is journaled within the length of the tube 205, Fig. 14, and has the timing gear 213 keyed on its lower end, beneath the gear 204. This gear 213 meshes with the gear 214 keyed on the lower end of the tube 227, causing it to oscillate in unison with the tube 205 when actuated by the rack 200.

Figure 31:
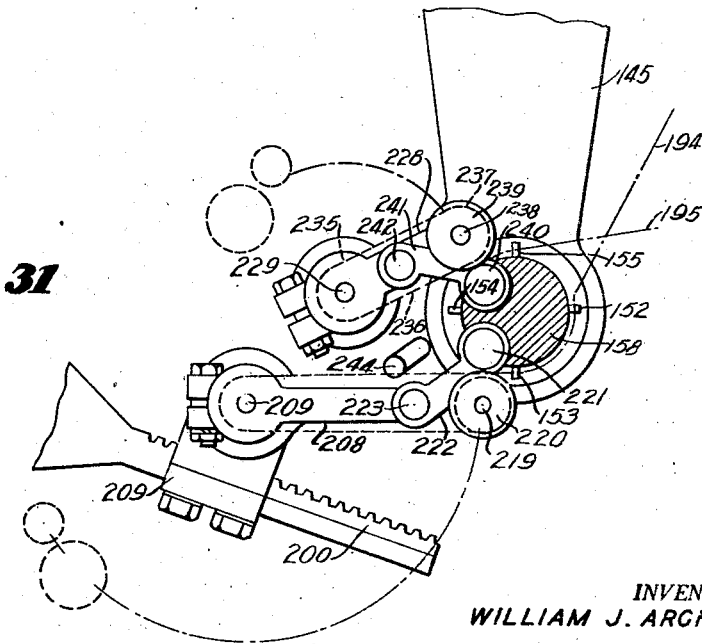
Fig. 31 is a diagrammatic plan view of the reeving mechanism.

The upper end of the shaft 209 has a sprocket 216 thereon driving the sprocket chain 217 engaging the sprocket 218 fixed on the lower end of the countershaft 219 that is journaled in the offset end of the swing arm 208, Fig. 13. The traction roller 220, Fig. 31, is fixed on the upper end of the countershaft 219 and cooperates with the pressure roller 221 mounted on the end of the swing arm 222 having the pivot 223 extending downward through the arm 208. This pivot is surrounded by the torsion spring 224, Fig. 14, having one end engaging the pivot and the other end anchored to the pin 225 on the arm 208, whereby the torsion of the spring normally urges the roller 221 into tractive contact with the roller 220, in receiving the longer wire end 195, Fig. 31.

The gear 213 keyed on the shaft 209, Fig. 14, meshes with the gear 226 on the lower end of the shaft 229, journaled in the tube 227. The swing arm 228 is adjustably fixed on the upper end of the tube 227. This arm 228 is oscillated by the reciprocations of the rack 200 through the timing gears at 204.

The sprocket 235 on the upper end of the shaft 229 drives the sprocket chain 236 engaging the sprocket 237 on the end of the countershaft 238. The traction roller 239 is fixed on the shaft 238 and the pressure roller 240 is mounted on the end of the swing arm 241 that has the pivot 242 extending through the offset portion of the swing arm 228 and is provided with a torsion spring and anchorpin similar in function to the spring and anchorpin 224, 225, previously described, whereby the traction roller 239 and pressure roller 240 are forced against the short wire end 195. In the extended positions indicated by interrupted lines in Fig. 31, the rollers 220, 221, and 239, 240 are separated by the sprags 320, 320′ shown in Fig. 34, to receive their respective wire ends 194, 195, as previously described.

Referring to Figs. 18, 19, the mandrel 156 is recessed at 245 and 246, to admit the pressure rollers 221, 240 respectively, to aline the peripheries of these rollers with the groove 253 in the top of the die 188. The shaping die 188 is similarly cut away as at 247, 248 for the same purpose, the mandrel being within the die during the reeving operation. It is the function of the rollers 220, 221 and 234, 240 to engage their respective ends 194, 195 of the wire and reeve them through the loops 196, 197, 198 lying within the grooves 152, 153, 155 of the mandrel, Figs. 18, 31.

When the transfer arm 146 reaches the station B in the cycle of operation, see Figs. 6, 3, 4, and the mandrel drops into the die 188, the ends 194, 195 of the wire protruding from the die, lie between the separated traction and pressure rollers 220, 221 and 234, 240 respectively, the swing arms 208, 228 upon which these rollers are mounted are then in the retracted positions, see interrupted lines, Fig. 31. In this position these rollers are normally separated by their respective sprags 320, 320', the ends 194, 195 of the wire drop between them respectively.

The contour of the cam 199, Fig. 22, is plotted to give a quick initial action to the rack 200 to swing the arms 208 and 228 into the operative positions shown in Fig. 13. During the dwell or concentric interval in the cam 199, Fig. 22, the arms 208, 228 are held in the operative positions just described. Synchronously with the swinging of the arms into cooperation with the mandrel, the pinion gear 213 on the shaft 205, Fig. 14, engages the segmental gear 192 on the periphery of the cam plate which drives the shafts 209, 229 in unison in reverse directions, completing the reeving of the wire ends as hereinafter described.

When the pressure rollers 221, 240 are swung into the recesses 245, 246 in the mandrel by the cam 199 they act with the rollers 220, 234 to exert traction on the interposed wire ends 194, 195, and reeve them through the grooves 253, 254, in the top of the die 188 and through the eyes 196, 197, 198 lying within the grooves 152, 153, 155 in the mandrel and the notches 255, 256, 257, 258 of the die 188, see Figs. 20, 21. The concentric grooves 253, 254 in the top of the die 188 are closed by the under plane of the annular head 151 of the mandrel during the B interval. The ends of the wire emerging from the die grooves 253, 254, are ready for the next stage in the cycle of operation, at C.

Figure 16:
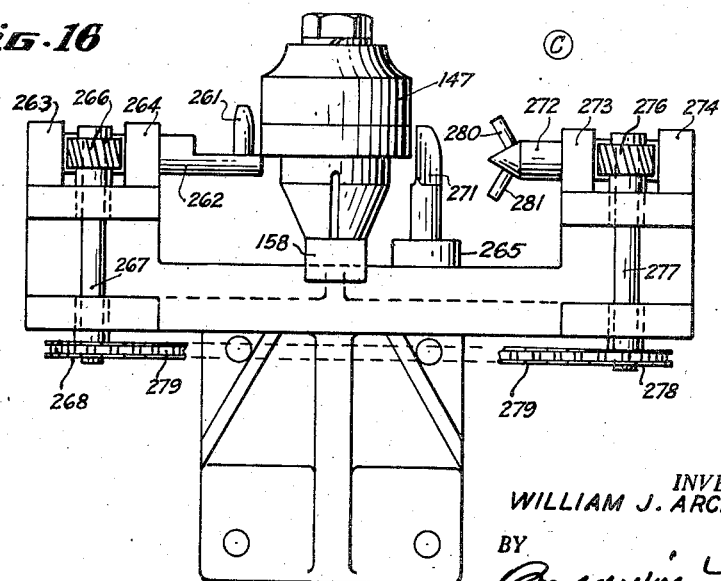
Fig. 16 is a front elevation of the same.

Fig. 31 diagrammatically illustrates in dot-dash lines the receiving position of the traction rollers 220, 234 when the rack 200 is retracted by the cam contour at 243, Fig. 22. The advance of the rack swings the arms 208, 228 toward the mandrel, carrying the wire ends 194, 195 and forming reverse loops in these wire ends. The longer end 194 is bent around the bight pin 244, Fig. 31, extending upward from the bracket 14 to form the bight eye 269, Fig. 5, when subsequently twisted at 270 by the finishing assembly, at C, Figs. 15, 16.

Following the reeving operation at B the cam 33, Fig. 8, lifts the rocker arm 50 to elevate the shaft 39 and the head 40. Synchronously with this lifting of the head the roller 42 engages the Geneva gear 43 to swing the arm 146 carrying the hood on the mandrel to the position of the arm 147, in Fig. 6, which centers the mandrel and hood over the finishing mechanism, see Figs. 15, 16 at C, where the mandrel is lowered by the contour of the cam 33.

When it leaves the reeving operation at B the two ends 194, 195 of the hood on the mandrel are crossed by the converging grooves 253, 254, Fig. 20, the end 194 having the bight bent around the pin 244 therein. In the position at C, Figs. 15, 16, this bight drops down over the tapered pin 261 fixed in the bight shaft 262 mounted in the bearings 263, 264 on the bracket on the side of the main frame. This shaft is rotated by the spiral gearing at 266 on the shaft 267 extending below and having the sprocket 268 fixed thereon. The rotation of the shaft 262 and the pin 261 completes the eye 269 on the twisted stem 270 on the hood, Fig. 5.

This bight eye and stem 269, 270, are directly opposite the crossed ends of the wire. The descent of the mandrel into the finishing assembly at C drops these crossed ends down over the wedge pin 271 mounted in the adjustable bracket 265. It is the function of this wedge pin to maintain the diameter of the finished hood so that it will drop freely over the mouth of the bottle. Otherwise the twisting of the ends at 282 may restrict this diameter in the finished hood. The terminal shaft 272, is mounted in the bearings 273, 274 on the bracket in alinement with the bight shaft 262 on the opposite side of the mandrel. This shaft 272 is rotated by the spiral gearing 276 and the shaft 277 having the sprocket 278 on its lower end and driven in unison with the shaft 272 by the sprocket chain 279. The tapered end of the shaft 272 is provided with two angularly projecting pins 280, 281, engaging the wire ends 194, 195 to form the twisted terminal 282 on the hood. The chain 279 encircles the sprockets 268, 278, and is driven by the sprocket 283 on the shaft 284. Fig. 6, having a pinion meshing with the gear 192, Fig. 22, in synchronism with the B operation Fig. 6.

The completed hood, still adhering to the end 158 of the mandrel, is swung into the bundling assembly forming the last step D, Fig. 6, by the fourth operation of the Geneva gearings 36, 42, 43 described, that now swings the arm 147 on the head 40 to the position 148, Figs. 32, 33. When the cam 33 and intervening mechanism lowers the arm 148, the axis of the mandrel is alined with the axis of the bundle rod 288. This rod is frictionally held by the spring clips 289, 290 on the lower portion of the bracket 291 bolted to the main frame. The washers 292, 292' fixed on the rod engaging the clips prevent vertical displacement of the rod therein. The yielding pawls 293, 294 on the pivots 295, 296 are mounted in bearings on the outer end of the horizontal portion 297 of the bracket. The other ends of these pivots have the cranks 298, 299 with the crank pins 300, 301 fixed thereon, respectively, and are connected together by the spring 302 that urges the cranks against their respective stop pins 303, 304, to normally maintain the hook ends of the pawls in substantially the position shown in Fig. 32. The descent of the mandrel causes its tapered portion 157 to pry the hook ends of the pawls apart until they ride up into the notches 153—155, Fig. 18. This carries the hooks above the wire ends 194, 195 reeved through the eyes of the hood.

At the next lift of the head 40, the arm 148 rises, causing the pawls 293, 294 to strip the finished hood from the mandrel as it rises. The freed hood then descends by gravity onto the bundle rod 288, until it rests on the washer 292. This completes the fourth step D in the cycle of operation and the arm 148 swings into the position of the arm 145 at A, Fig. 6, for subsequent cycles. The Veeder counter 298 mounted on the bracket 297 records each hood as it slides down the rod 288. Every quarter swing of the head 49 deposits a completed hood onto the rod 288. When the rod is filled to its height it is grasped between the clips 289, 290 and manually withdrawn, and another rod substituted. The bundle of hoods is removed from the rod and packed in any desirable manner for the trade.

The present machine in its entirety has been designed to automatically produce the complete wire hoods ready for use as shown in Fig. 5. But any one of all of the subsequent operations performed at the steps B, C, D, E, could be omitted and the product of the first operation at A, could be completed by performing B, C, D, manually, if desired.

In the second stage of operation B, see Figs. 13, 14, 34, the traction and pressure rollers 220, 221 and 234, 240 respectively, lie in the positions in Fig. 34, with the rollers slightly separated to receive the wire ends. Normally these wire ends 194, 195, will aline with the gaps between the pairs of rollers respectively. To positively assure such alinement regardless of occasional kinks and unequal lengths of the wire ends, the following guiding and clipping means is provided at E, Fig. 34, omitted from Fig. 6.

This guiding and clipping mechanism is driven by the vertical shaft 117, synchronized with the descent of the mandrel arm in the 146 position at B, Fig. 6. This mechanism is mounted on the plate 305 that is bolted to and extends outwardly from the table 5. The gear 116 has the cam 306, Fig. 35, fixed to its underside, up which the trip 307 rides, against the tension of the spring 308. This trip is mounted on the shaft 309 in the bearing 310, that is mounted on the bracket 311, bolted to the top of the table 5.

The depression of the trip 307 swings the segmental rack 312 fixed on the shaft 309, that meshes with the pinion 313 and rotates the shaft 314 one-half revolution contra-clockwise. The swing arms 315, 316, fixed on the outer end of this shaft, Fig. 35, acting in unison, pick up the wire end 194 and swing it beneath the arcuate guide 317 on the plate 5. This forces the wire end 194 into the space between the traction and pressure rollers 220, 221, and between the jaws 318, 319 of the wire cutter, which nips off the excessive length of the wire end 194 close to the rollers 220, 221. In this position the roller 221 is slightly separated from the roller 220, by the V shape sprag 320, pivoted on the plate 305 and yieldingly held in the path of the pressure arm 208 upon which the pressure rollers 221 revolves. This separates these rollers to receive the wire end. A similar sprag 320' simultaneously separates the rollers 234, 240 to receive the wire end 195.

A similar guiding assembly is provided to force the opposite wire end 195 between the traction rollers 234, 240. It comprises the pair of arms 322, 323 pivoted on the plate 305 and cross connected with the arm 315 by the link 324, which causes this pair of arms to operate in unison, but in opposite directions respectively, Fig. 38. The arm 323 is yieldingly mounted to permit it to pass over the wire guide on the return stroke, after guiding the wire end 195 between the cutting jaws 325, 326. The two pairs of cutting jaws 318, 319 and 325, 326 are pivoted together at 327, 328 respectively. The lower jaw extensions are mounted on the stud pivots 327', 328', mounted on the plate 305. The upper extension of the jaw 318, has the stud 330 fixed therein and has the collar 331 free thereon and engaging the slot 332 in the extension 326 of the opposite wire clipper described: whereby the pull of the rod 332, closes the clipping jaws simultaneously.

This stud 330, engages the head 333, adjustable on the end of the push rod 332, having the head 335 adjustably mounted on its driven end and engaging the stud 336, eccentrically mounted on top of the bevel gear 116 on the upper end of the driving shaft 117. The clipping jaw assemblies described clip the wire ends 194, 195 in synchronism with the guiding operation at E and the descent of the mandrel at B.

After the clipping operation the rack 200, swings the reeving assembly, including the pairs of traction rollers 220, 221 and 234, 240 with the wire ends 194, 195 gripped there-between respectively into the positions shown in Fig. 31, and the wire ends are reeved through the eyelets 196—198 as previously described.

Having thus described this invention what is claimed and desired to secure by Letters Patent is:

1. A machine in the class described including a main frame and motive means; a mandrel mounted on said frame and adapted to be raised and swung laterally and lowered by said motive means; a pair of annular plates in concentric relation to said mandrel and held in yielding relation to each other on said frame and having registering grooves in their meeting faces, with divergent inlet and outlet openings into and from said grooves; a wire feeding means on said frame in operative relation to said groove inlet and driven by said motive means in synchronism with the operation of said mandrel and adapted to feed a length of wire into said grooves; radial plungers on said frame guided between said plates and adapted to abut the wire in said grooves and move it into contact with said mandrel; radial twister shafts on said frame interspaced between said plungers and having resilient clamps engageable with said wire in the grooves; and driving means actuated by said motive means for synchronously advancing said plungers and rotating said twister shafts.

2. A machine in the class described including a main frame and motive means; a mandrel mounted on said frame and adapted to be raised, swung laterally and lowered; a pair of annular plates on said frame in concentric relation to the axis of said mandrel and held in yielding relation to each other and having registering grooves in their meeting faces, with divergent inlet and outlet openings into and from said grooves; a wire feeding assembly on said frame in operative relation to said groove inlet and adapted to feed a length of wire into the grooves in said plates; radial plungers on said frame and guided in sockets between said plates and adapted to abut the wire in said grooves and move it into contact with said mandrel; radial twister shafts on said frame interspaced between said plungers and having end clamps engageable with said wire; and automatic means actuated by said motive means and adapted to synchronously operate said wire feeding assembly, plungers, twister shafts and mandrel.

3. A machine in the class described including a main frame and motive means; a mandrel mounted on said frame and adapted to be raised, swung laterally and lowered; a pair of annular plates on said frame surrounding said mandrel and held in yielding relation to each other; means for feeding a length of wire between said plates and forming it into a loop having overlapping ends; radial plungers on said frame and guided in sockets between said plates and adapted to abut said wire and move it into contact with said mandrel; radial twister shafts on said frame and extending between said plates between said plungers and having end clamps engageable with said wire; and automatic driving means actuated by said motive means and adapted to synchronously operate said wire feeding means, plungers, twister shafts and mandrel.

4. A machine in the class described including a main frame and motive means; a mandrel mounted on said frame and adapted to be raised, swung laterally and lowered, and having longitudinal slots therein; a pair of plates on said frame surrounding said mandrel and held in yielding relation to each other; means for feeding a wire between said plates and forming it into a severed loop having extended ends; radial plungers on said frame and extending between said plates and adapted to abut the wire of said loop and move it into contact with said mandrel; twister shafts on said frame, interspaced between said plungers and having end clamps engageable with said wire loop and adapted to twist said wire and form eyes in the twisted portions; a reeving assembly on said frame in the path of said mandrel comprising a forming die on said frame adapted to receive the lowered mandrel and reeve the extended ends of the wire loop through the eyes formed by the twister shafts; and automatic driving means adapted to synchronously operate said wire feeding means, plungers, twister shafts, mandrel and reeving assembly.

5. A machine in the class described including a main frame and motive means; a mandrel mounted on said frame and adapted to be raised, swung laterally and lowered, and having longitudinal slots therein; a pair of plates on said frame surrounding said mandrel and held in yielding relation to each other; means for feeding a length of wire between said plates and forming it into a loop having extended ends; radial plungers on said frame and extending between said plates and adapted to abut said wire and move it into contact with said mandrel; twister shafts on said frame, interspaced between said plungers and having end clamps engageable with said wire between said plates and adapted to twist it and form eyes in the twisted portions; a reeving assembly on said frame in the path of said mandrel and comprising a forming die adapted to receive the lowered mandrel and bend said twisted portions so that said eyes enter said slots and reeve the extended ends of the wire through the eyes formed by said twister shafts; and automatic driving means actuated by said motive means adapted to synchronously operate said wire feeding means, plungers, twister shafts, mandrel and reeving assembly.

6. A machine in the class described including a main frame and motive means; a mandrel mounted on said frame and adapted to be raised, swung laterally and lowered, and having longitudinal slots therein; a pair of plates on said frame surrounding said mandrel and held in yielding relation to each other and having wire guiding grooves therebetween; means for feeding a length of wire between said plates and forming it into a loop having overlapping extended ends; radial plungers guided between said plates and adapted to abut said wire and move it into contact with said mandrel; twister shafts on said frame, guided between said plates and having end clamps engageable with said wire intermediate said plungers when said plates are in contact and adapted to twist and form eyes in said wire; a reeving assembly on said frame in the path of said mandrel, comprising a forming die adapted to receive the lowered mandrel and lay said twisted portions into said slots and reeve the extended ends of the wire through the eyes formed by the twister shafts; and automatic driving means actuated by said motive means and adapted to synchronously operate said wire feeding means, plungers, twister shafts, mandrel and reeving assembly.

7. A machine in the class described including a main frame and motive means; a mandrel mounted on said frame and adapted to be raised, swung laterally and lowered, and having longitudinal slots therein; a pair of plates on said frame surrounding said mandrel and held in yielding relation to each other; means for feeding a length of wire between said plates and forming it into a loop with extended ends; radial plungers extending between said plates and adapted to abut said wire and move it into contact with said mandrel; twister shafts extending between said plates and adapted to engage and twist said wire intermediate said plungers and form eyes in the twisted portions; a reeving assembly on said frame in the path of said mandrel and comprising a forming die adapted to receive the lowered mandrel and bend said twisted portions so that they enter said slots; traction means in said reeving assembly adapted to engage said wire ends respectively and reeve them through said eyes; and automatic driving means actuated by said motive means, adapted to synchronously operate said wire feeding means, plungers, twister shafts, mandrel and reeving assembly.

8. A machine in the class described, including a main frame and motive means; a mandrel mounted on said frame and adapted to be raised, swung laterally and lowered, and having longitudinal slots therein; a pair of plates on said frame surrounding said mandrel and held in yielding relation to each other; means for feeding a length of wire between said plates and forming it into a loop with extended ends; radial plungers extending between said plates and adapted to abut said wire and move it into contact with said mandrel; twister shafts extending between said plates and adapted to engage and twist said wire intermediate said plungers and form eyes in the twisted portions; a reeving assembly on said frame in the path of said mandrel and comprising a forming die adapted to receive the lowered mandrel and bend said twisted portions into said notches; opposed traction means in said reeving assembly adapted to engage said wire ends respectively and reeve them through said eyes; a finishing assembly in the path of said mandrel in sequence to said reeving assembly and comprising a bight shaft having a transverse pin adapted to engage said wire between two of said eyes and twist it upon itself; a terminal shaft having means thereon for engaging said terminal wire end portions and twisting them together; and automatic driving means actuated by said motive means, adapted to synchronously operate said wire feeding means, plungers, twister shafts, mandrel, reeving and finishing assemblies.

9. A machine in the class described including a main frame and motive means; a mandrel mounted on said frame and adapted to be raised, swung laterally and lowered and having longitudinal slots therein; a pair of plates on said frame and surrounding said mandrel and held in yielding relation to each other; means for feeding a length of wire between said plates and forming it into a severed loop with extended ends; radial plungers on said frame between said plates and adapted to abut said wire loop and move it into contact with said mandrel; twister shafts on said frame, interspaced between said plungers and adapted to engage and twist said wire loop between said plungers and form eyes in the twisted portions between said ends; a reeving assembly on said frame in the path of said mandrel and comprising a forming die adapted to receive the lowered mandrel and bend said twisted portions so that said eyes enter said slots, and reeve the extended ends of the wire through said eyes on the twisted portions; a finishing assembly in the path of said mandrel, comprising a bight shaft having a pin adapted to engage the wire between two of said twisted portions and form a bight eye therein opposite said extended ends; a terminal shaft opposite said bight shaft and having opposed pins thereon adapted to engage both of said ends and twist them together when said terminal shaft is revolved; and automatic driving means actuated by said motive means, adapted to synchronously operate said wire feeding means, plungers, twister shafts, mandrel, reeving assembly and finishing assemblies.

10. A machine in the class described including a main frame and motive means; a mandrel mounted on said frame and adapted to be raised, swung laterally and lowered and having longitudinal slots therein; a pair of plates on said frame and surrounding said mandrel and held in yielding relation to each other; means for feeding a length of wire between said plates and forming it into a severed loop with extended ends; radial plungers extending between said plates and adapted to abut said wire and move it into contact with said mandrel; twister shafts extending between said plates and adapted to engage and twist said wire intermediate said plungers and form eyes in the twisted portions of said wire intermediate said ends; a reeving assembly on said frame in the path of said mandrel and comprising a forming die adapted to receive the lowered mandrel and bend said twisted portions into said slots in the mandrel; traction means in said reeving assembly adapted to engage said wire ends respectively and reeve them through said eyes; a finishing assembly in the path of said mandrel in sequence to said reeving assembly and comprising a bight shaft having a transverse pin adapted to engage said wire between two of said eyes and twist it upon itself; a terminal shaft having means thereon for engaging said terminal wire end portions and twisting them together; a bundling assembly in the path of said mandrel in sequence with said reeving assembly and comprising a bracket on said frame having opposed yielding pawls pivoted thereon on opposite sides of said mandrel; a bundle rod removably mounted on said bracket on said frame below said pawls and adapted to receive the wire product of the finishing assembly stripped by said pawls from said mandrel when it rises; and automatic driving means actuated by said motive means, adapted to synchronously operate said wire feeding means, plungers, twister shafts, mandrel, reeving and finishing assemblies.

11. A machine in the class described, including a main frame and motive means; a mandrel mounted on said frame and adapted to be raised, swung laterally and lowered into a forming die on said frame, by said motive means; a pair of annular plates on said frame in concentric relation to said mandrel and held in yielding relation to each other on said frame and having registering grooves in their meeting faces, with divergent inlet and outlet openings into and from said grooves; a wire feeding means on said frame in operative relation to said inlet opening and driven by said motive means in synchronism with the operation of said mandrel and adapted to feed a length of wire into said inlet opening between said plates; radial plungers on said frame, guided between said plates and adapted to abut the wire in said grooves and move it into contact with said mandrel; radial twister shafts on said frame, interspaced between said plungers and having resilient clamp ends engageable with said wire in the grooves and adapted to twist the end portions together, and form eyes in the wire intermediate said plungers respectively; a forming die on said frame in the path of said mandrel and adapted to bend said twisted wire portions and concentrically aline said eyes; a reeving assembly adapted to engage the free ends of said wire, reverse their direction and reeve them through said eyes; and means actuated by said motive means for synchronously advancing said plungers, rotating said twister shafts and actuating said reeving assembly.

12. A machine in the class described including a main frame and motive means; a mandrel having slots therein and mounted on said frame; a forming die on said frame; means for feeding a length of wire around said mandrel and forming twisted portions therein radiating from said mandrel and having eyes in their ends, and twisting the end portions of said wire together; means for raising, swinging and lowering said mandrel into said forming die and bending said twisted portions into the slots in said mandrel; a reeving assembly on said frame having swing arms with traction means thereon engaging the respective ends of said wire and reeving them through said eyes respectively; and automatic driving means actuated by said motive means and adapted to synchronously operate said wire feeding, twisting, raising, swinging and lowering means and said reeving assembly.

13. A machine in the class described, including a main frame and motive means; a mandrel having slots therein and mounted on said frame; a forming die on said frame; means for feeding a length of wire around said mandrel and forming twisted portions therein radiating from said mandrel and having eyes in their ends, and twisting the end portions of said wire together; means for raising, swinging and lowering said mandrel into said forming die and bending said twisted portions into the slots in said mandrel; a reeving assembly on said frame having swing arms with traction rollers thereon engaging the respective ends of said wire; means for swinging said arms and revolving said traction rollers and reeving said ends through said eyes; a finishing assembly in the path of said mandrel having a revolving shaft with a pin engaging the bight in said wire between two of said eyes and forming an eye in said bight; and a terminal shaft having pins engaging and twisting together the terminal ends of said wire; and automatic driving means actuated by said motive means and adapted to synchronously operate said wire feeding and twisting means, mandrel raising, swinging and lowering means and said reeving assembly and finishing assembly.

14. A machine in the class described, including a main frame and motive means; a mandrel having slots therein and mounted on said frame; a forming die on said frame; means for feeding a length of wire around said mandrel and forming twisted portions therein radiating from said mandrel and having eyes in their ends, and twisting the end portions of said wire together; means for raising, swinging and lowering said mandrel into said forming die and bending said twisted portions into the slots in said mandrel; a reeving assembly on said frame having arms with traction rollers thereon engaging the respective ends of said wire; means for swinging said arms and revolving said traction rollers and reeving said ends through said eyes; a finishing assembly in the path of said mandrel having a revolving shaft having pins engaging and twisting together the terminal ends of said wire; a bundling assembly in the path of said mandrel in sequence with said reeving assembly and comprising a bracket on said frame and having opposed yielding pawls pivoted thereon on the opposite sides of said mandrel; a bundle rod removably mounted on said frame below said pawls and receiving the wire product of the finishing assembly stripped by said pawls from said mandrel when it rises; and automatic driving means actuated by said motive means and adapted to synchronously operate said wire feeding and twisting means, mandrel raising and swinging and lowering means, and said reeving, finishing and bundling assemblies.

15. A machine in the class described, including a main frame and motive means; a mandrel having longitudinal slots and separated recesses therein and an upper annular flange thereon; a forming die on said frame in the path of said mandrel and having cutaway portions registering with said recesses in the mandrel, and arcuate grooves in its upper edge; means for feeding a length of wire around said mandrel and forming twisted portions therein radiating from said mandrel and having eyes in their ends, and twisting the wire end portions together; means for raising, swinging and lowering said mandrel into said forming die and bending said twisted portions into the slots in the mandrel and alineing said eyes with the groove in the top of said forming die; a reeving assembly on said frame and having pivotal arms with traction and pressure rollers thereon engaging the ends of said wire and swinging them into alinement with said arcuate grooves as the pressure rollers enter said recesses in the mandrel, and reeve said ends through the said eyes registering with said groove in the top of the die; a finishing assembly in the path of said mandrel and having a revolving shaft engaging and twisting together the terminal ends of said wire.

16. A machine in the class described, including a main frame and a motive means; a mandrel having slots therein and mounted on said frame; a forming die on said frame; means for feeding a length of wire around said mandrel and forming twisted portions therein radiating from said mandrel and having eyes in their ends, and twisting the end portions of said wire together; means for raising, swinging and lowering said mandrel into said forming die and bending said twisted portions into the slots in said mandrel; a reeving assembly on said frame and having arms with traction rollers thereon respectively; a guiding and clipping assembly having clipping jaws alined with said traction rollers respectively and oscillating swing arms acting in unison to guide the end portions of said wire between said traction rollers and clipping jaws respectively; means for closing said jaws and swinging said arms and revolving said traction rollers and reeving said wire ends through said eyes within said forming die; a finishing assembly in the path of said mandrel and having a revolving shaft engaging and twisting together the terminal ends of said wire; means for stripping the product from said mandrel; and automatic driving means actuated by said motive means and synchronously driving said various wire product forming means and assemblies with the movements of said mandrel.

17. A machine in the class described, including a main frame and a motive means; a tapered mandrel having an upper annular flange and longitudinal slots and recesses therein; a swing arm mounted on said frame and supporting said mandrel; means for raising, swinging and lowering said arm; means for feeding a length of wire around said mandrel and forming twisted portions therein, radiating from said mandrel and having eyes in their ends, and twisting the end portions of said wire together; a reeving assembly on said frame in the path of said mandrel and comprising a forming die receiving the lowered mandrel and bending said twisted portions into said slots in the mandrel; swing arms pivoted on said frame and having driven traction rollers thereon; pressure rollers pivoted on said arms in juxtaposition to said traction rollers and driven thereby when said pressure rollers enter the recesses in said mandrel, said traction and pressure rollers being positioned to respectively receive the wire ends extending from said die and bend them backwardly and reeve them through said eyes in said twisted portions in said slots; and automatic driving means actuated by said motive means and driving said various wire forming means and assemblies synchronously with the movements of said mandrel.

18. A machine in the class described, including a main frame and a motive means; a tapered mandrel having an upper annular flange and longitudinal slots and recesses therein; a swing arm mounted on said frame and supporting said mandrel; means for raising, swinging and lowering said arm; means for feeding a length of wire around said mandrel and forming twisted portions therein, radiating from said mandrel and having eyes in their ends, and twisting the end portions of said wire together; a reeving assembly on said frame in the path of said mandrel and comprising a forming die receiving the lowered mandrel and bending said twisted portions into the slots in the mandrel; swing arms pivoted on said frame and having driven traction rollers thereon; pressure rollers pivoted on said arms in juxtaposition to said traction rollers and driven thereby when said pressure rollers enter the recesses in said mandrel respectively; a guiding and clipping assembly adjacent said forming die and engaging the wire ends projecting from said die and guiding them between their respective traction and pressure rollers and clipping the excess lengths from said ends; means for swinging said swing arms in opposite directions and forcing said pressure rollers into their respective recesses in the mandrel and reeving said wire ends through the eyes in said twisted portions in the slots in the mandrel; and automatic driving means actuated by said motive means and driving said various wire forming means and assemblies synchronously with the movements of said mandrel.

19. A machine in the class described, including a main frame and a motive means; a mandrel having longitudinal slots therein and mounted on said frame; a forming die on said frame; means for feeding a length of wire around said mandrel and forming twisted portions therein radiating from said mandrel and having eyes in their ends, and twisting the end portions of said wire together; means for raising, swinging and lowering said mandrel into said forming die and bending said twisted portions into the slots in said mandrel; a reeving assembly on said frame and having pivotal arms on the opposite sides of said die with traction rollers and pressure rollers in pivotal relation thereon respectively; a guiding and clipping assembly on said frame and having clipping jaws alined with the space between said traction and pressure rollers respectively; guide arms oscillating in opposite directions and guiding the extended ends of said wire into said jaws and the space between said traction and pressure rollers respectively; means for closing said jaws and moving said swing arms rotating said traction and pressure rollers to cause them to reeve said wire ends through the eyes in the twisted portions within said slots in the mandrel; a finishing assembly in the path of said mandrel and having a revolving shaft engaging and twisting together the terminal ends of said wire; means for stripping the wire product from said mandrel as it rises; and automatic driving means actuated by said motive means and driving said various wire product forming means and assemblies synchronously with the movements of said mandrel.

20. A machine in the class described, including a main frame and motive means; a mandrel having slots therein and mounted on said frame and adapted to be raised, swung laterally and lowered; a pair of annular plates on said frame surrounding said mandrel and held in yielding relation to each other; means for feeding a length of wire between said plates and forming it into a loop having overlapping ends; radial plungers on said frame and guided in sockets between said plates and adapted to abut said wire and move it into contact with said mandrel; radial twister shafts on said frame and extending between said plates and having resilient end clamps engaging and twisting said wire between said plungers and forming eyes in the twisted portions of said wire intermediate said twisted ends; a reeving assembly on said frame in the path of said mandrel and comprising a forming die adapted to receive the lowered mandrel and bend said twisted portions into said slots in the mandrel; swing arms with traction rollers thereon engaging the respective ends of the wire; means for swinging said arms and revolving said traction rollers and reeving said ends through said eyes; a finishing assembly in the path of said mandrel having a revolving shaft with a pin engaging the bight in said wire between two of said eyes and forming an eye in said bight; a terminal shaft having pins engaging and twisting together the terminal ends of said wire; a bundling assembly on said frame in the path of said mandrel in sequence with said reeving assembly and comprising opposed yielding pawls pivoted thereon on the opposite sides of said mandrel; a bundle rod removably mounted on said frame below said pawls and receiving the wire product of the finishing assembly stripped by said pawls from said mandrel when it rises; a registering counter in the path of said product as it is stripped onto said rod; and automatic driving means actuated by said motive means and synchronously driving said various product forming means and assemblies with the movements of said mandrel.

WILLIAM J. ARCHER.

REFERENCES CITED

The following references are of record in the file of this patent:

UNITED STATES PATENTS

| Number | Name | Date |
|---|---|---|
| 477,617 | Wile, et al. | June 21, 1892 |
| 162,042 | Mestre | Apr. 13, 1875 |
| 1,394,796 | Smith | Oct. 25, 1921 |